US009222296B2

(12) United States Patent
Hamminga et al.

(10) Patent No.: US 9,222,296 B2
(45) Date of Patent: Dec. 29, 2015

(54) LINEAR DRIVE ACTUATOR FOR A MOVABLE VEHICLE PANEL

(75) Inventors: Jeffrey S. Hamminga, Macomb, MI (US); Waldemar Wawrzyniec Gmurowski, Hamtramck, MI (US)

(73) Assignee: STRATTEC POWER ACCESS LLC, Troy, MI (US)

( * ) Notice: Subject to any disclaimer, the term of this patent is extended or adjusted under 35 U.S.C. 154(b) by 1204 days.

(21) Appl. No.: 12/671,754

(22) PCT Filed: Aug. 6, 2008

(86) PCT No.: PCT/US2008/009429

§ 371 (c)(1), (2), (4) Date: Sep. 19, 2011

(87) PCT Pub. No.: WO2009/020610

PCT Pub. Date: Feb. 12, 2009

(65) Prior Publication Data

US 2012/0000304 A1 Jan. 5, 2012

Related U.S. Application Data

(60) Provisional application No. 60/963,589, filed on Aug. 6, 2007.

(51) Int. Cl.

*F16H 1/16* (2006.01)
*F16H 1/20* (2006.01)

(Continued)

(52) U.S. Cl.

CPC ............. *E05F 15/622* (2015.01); *E05F 1/1058* (2013.01); *E05Y 2400/337* (2013.01);

(Continued)

(58) Field of Classification Search

USPC ............ 74/89.23, 89.34, 89.39, 89.14, 89.16, 74/89.38; 296/76, 107.08, 193.11, 146.4, 296/107.09, 107.15, 146.8, 112, 15, 228; 192/56.1, 56.6, 56.61; 40/337, 340, 40/341, 344

See application file for complete search history.

(56) References Cited

U.S. PATENT DOCUMENTS 561,848 A * 6/1896 Woodall ....................... 74/89.34
1,902,683 A * 3/1933 Wildhaber ...................... 74/458

(Continued)

FOREIGN PATENT DOCUMENTS

| | | |
|---|---|---|
| GB | 792386 | 3/1958 |
| JP | 63079457 | 4/1988 |

(Continued)

OTHER PUBLICATIONS

International Search Report for International Application No. PCT/US2008/009429, 2 pages, Nov. 3, 2008.

(Continued)

*Primary Examiner* — William Kelleher
*Assistant Examiner* — Jake Cook
(74) *Attorney, Agent, or Firm* — Michael Best & Friedrich LLP

(57) ABSTRACT

An apparatus for opening and closing a deck lid of a vehicle body includes a jack-screw type drive unit having two elongated relatively rotatable drive elements which are threadably engaged for controlled bi-directional displacement. An electric motor engages the rotatable drive element. A first mounting device pivotally connects the rotatable drive element to a relatively fixed point on the vehicle. A second mounting device pivotally connects the non-rotatable drive element to the deck lid, or vice versa. The motor is energized to affect bi-directional control of the drive unit while enabling low back-drive effort. A concentric spring counters loading due to the weight of the deck lid.

13 Claims, 7 Drawing Sheets

(51) Int. Cl.

| | |
|---|---|
| ***F16H 3/06*** | (2006.01) |
| ***F16H 27/02*** | (2006.01) |
| ***F16H 29/02*** | (2006.01) |
| ***F16H 29/20*** | (2006.01) |
| ***E05F 15/622*** | (2015.01) |
| *E05F 1/10* | (2006.01) |

(52) U.S. Cl.

CPC ..... *E05Y 2800/205* (2013.01); *E05Y 2800/232* (2013.01); *E05Y 2800/238* (2013.01); *E05Y 2900/546* (2013.01); *E05Y 2900/548* (2013.01); *Y10T 74/18576* (2015.01)

(56) References Cited

U.S. PATENT DOCUMENTS

| | | | | | |
|---|---|---|---|---|---|
| 2,114,645 | A | * | 4/1938 | Van Benschoten | 49/279 |
| 2,245,240 | A | * | 6/1941 | Wittel | 74/425 |
| 2,328,897 | A | * | 9/1943 | Gill | 192/142 R |
| 2,366,613 | A | * | 1/1945 | Hagstrom | 49/252 |
| 2,371,336 | A | * | 3/1945 | Levon | 49/340 |
| 2,387,800 | A | * | 10/1945 | Leland et al. | 318/14 |
| 2,540,538 | A | * | 2/1951 | Matchett | 49/340 |
| 2,594,643 | A | | 4/1952 | Gustisha | |
| 2,651,212 | A | * | 9/1953 | Mackmann | 74/425 |
| 2,719,036 | A | | 9/1955 | Brundage | |
| 2,842,976 | A | * | 7/1958 | Young | 74/425 |
| 2,844,969 | A | * | 7/1958 | Lohr | 74/89.38 |
| 2,854,058 | A | * | 9/1958 | Baker | 72/122 |
| 2,857,776 | A | * | 10/1958 | Steere et al. | 74/89.37 |
| 2,916,319 | A | * | 12/1959 | Du Bois | 292/341.16 |
| 2,944,343 | A | * | 7/1960 | Anthony | 33/501.19 |
| 2,967,461 | A | * | 1/1961 | Wildhaber | 409/12 |
| 2,981,518 | A | * | 4/1961 | Wise | 254/101 |
| 3,044,311 | A | * | 7/1962 | Gagnon | 74/89.14 |
| 3,079,808 | A | * | 3/1963 | Wildhaber | 74/458 |
| 3,081,078 | A | * | 3/1963 | Lohr | 49/139 |
| 3,159,758 | A | | 12/1964 | Hemperly, Jr. et al. | |
| 3,161,074 | A | * | 12/1964 | Korthaus et al. | 74/89.34 |
| 3,386,305 | A | * | 6/1968 | Wildhaber | 74/425 |
| 3,552,145 | A | * | 1/1971 | Barton et al. | 464/73 |
| 4,663,626 | A | | 5/1987 | Smith | |
| 4,934,203 | A | | 6/1990 | Bailey et al. | |
| 5,140,771 | A | * | 8/1992 | Moy et al. | 49/340 |
| 5,144,769 | A | | 9/1992 | Koura | |
| 5,195,796 | A | | 3/1993 | Wampler, II | |
| 5,201,391 | A | * | 4/1993 | Arai et al. | 192/58.4 |
| 5,367,826 | A | | 11/1994 | Wu | |
| 5,434,487 | A | * | 7/1995 | Long et al. | 318/286 |
| 5,644,869 | A | | 7/1997 | Buchanan, Jr. | |
| 5,664,457 | A | * | 9/1997 | Nejati | 74/110 |
| 5,809,833 | A | * | 9/1998 | Newport et al. | 74/89.37 |
| 5,865,272 | A | | 2/1999 | Wiggins et al. | |
| 5,920,158 | A | | 7/1999 | Miller et al. | |
| 5,986,420 | A | * | 11/1999 | Kato | 318/272 |
| 6,026,536 | A | * | 2/2000 | Miller et al. | 15/250.31 |
| 6,053,061 | A | * | 4/2000 | Furukawa et al. | 74/89.14 |
| 6,055,776 | A | | 5/2000 | Dettling et al. | |
| 6,075,298 | A | | 6/2000 | Maue et al. | |
| 6,193,288 | B1 | | 2/2001 | Taga et al. | |
| 6,193,300 | B1 | | 2/2001 | Nakatomi et al. | |
| 6,250,170 | B1 | * | 6/2001 | Hill et al. | 74/89.23 |
| 6,374,544 | B1 | * | 4/2002 | Ellis | 49/249 |
| 6,398,271 | B1 | | 6/2002 | Tomaszewski et al. | |
| 6,454,339 | B2 | | 9/2002 | Wilde et al. | |
| 6,516,567 | B1 | * | 2/2003 | Stone et al. | 49/343 |
| 6,520,557 | B2 | | 2/2003 | Benthaus et al. | |
| 6,601,903 | B2 | | 8/2003 | Nakagome | |
| 6,676,190 | B2 | | 1/2004 | Daniels et al. | |
| 6,719,356 | B2 | * | 4/2004 | Cleland et al. | 296/146.8 |
| 6,814,392 | B1 | | 11/2004 | Tomaszewski | |
| 7,066,041 | B2 | * | 6/2006 | Nielsen | 74/89.35 |
| 7,071,644 | B2 | * | 7/2006 | Kawanobe | 318/280 |
| 7,243,976 | B2 | | 7/2007 | Okada et al. | |
| 7,314,243 | B2 | | 1/2008 | Okada et al. | |
| 7,556,132 | B2 | * | 7/2009 | Kornsteiner et al. | 192/56.1 |
| 7,661,332 | B2 | * | 2/2010 | Maeda | 74/425 |
| 7,938,473 | B2 | * | 5/2011 | Paton et al. | 296/146.8 |
| 8,042,301 | B2 | * | 10/2011 | Ritter | 49/343 |
| 8,210,064 | B2 | * | 7/2012 | Ku | 74/89.39 |
| 8,267,119 | B2 | * | 9/2012 | Moench et al. | 137/625.46 |
| 8,312,783 | B2 | * | 11/2012 | McKay | 74/89.39 |
| 8,567,129 | B2 | * | 10/2013 | Suzuki et al. | 49/506 |
| 2003/0006622 | A1 | | 1/2003 | Baik | |
| 2003/0038500 | A1 | | 2/2003 | Aubry et al. | |
| 2006/0005653 | A1 | * | 1/2006 | Fleytman | 74/425 |
| 2006/0261626 | A1 | | 11/2006 | Okada et al. | |
| 2007/0234642 | A1 | * | 10/2007 | Bildahl et al. | 49/341 |
| 2007/0289135 | A1 | * | 12/2007 | Oberle et al. | 29/893.1 |
| 2008/0093877 | A1 | | 4/2008 | Liao | |
| 2008/0134815 | A1 | * | 6/2008 | Larsen et al. | 74/89.34 |
| 2008/0196524 | A1 | * | 8/2008 | Oberle et al. | 74/89.34 |
| 2008/0295624 | A1 | * | 12/2008 | Oberle et al. | 74/89.34 |
| 2009/0200830 | A1 | * | 8/2009 | Paton et al. | 296/146.8 |
| 2010/0236343 | A1 | * | 9/2010 | Chiang et al. | 74/89.34 |
| 2012/0204666 | A1 | * | 8/2012 | Gotou et al. | 74/425 |

FOREIGN PATENT DOCUMENTS

| | | |
|---|---|---|
| JP | 2001-012145 A | 1/2001 |
| KR | 20-1999-0011536 | 3/1999 |

OTHER PUBLICATIONS

Office Action Summary from Korean Application No. 10-2010-7004916, dated Mar. 19, 2014, 6 pages.

* cited by examiner

LINEAR DRIVE ACTUATOR FOR A MOVABLE VEHICLE PANEL

CROSS-REFERENCE TO RELATED APPLICATIONS

This patent application is a national stage filing under 35 U.S.C. 371 of International Application No. PCT/US2008/009429, filed 6 Aug. 2008, and claims priority to U.S. Provisional Patent Application No. 60/963,589, filed Aug. 6, 2007, the entire contents of which are incorporated herein by reference.

TECHNICAL FIELD

The present invention relates to mechanisms for controlling movable panels carried on motor vehicles. More particularly, the present invention relate to power drive mechanisms for trunk lid and lift gate assemblies which are controllable for selectively driving a movable panel between open and closed positions.

BACKGROUND OF THE INVENTION

As motor vehicles characterized by their utility become a mainstream choice, consumers demand certain luxuries primarily associated with passenger cars, either due to their inherent design and/or size. One of the features desired by consumers is the automated movement of such items as sliding doors and lift gates. While features offering automated motion are available, the designs for mechanisms used to accommodate manual overrides are lacking in capability and functionality. Further, the systems consume space within the motor vehicle that makes the interior less efficient and aesthetically less appealing.

Continued demand for enhanced passenger convenience and comfort has caused automobile manufacturers to expand power assist functions in most vehicle systems involving movable panels. In most cases, the power assist is implemented via an electric motor and geared transmission mechanically coupled with an associated movable panel whereby the vehicle operator can control the system by simply actuating a control switch.

In addition to more traditional truck-type movable panels, motor vehicles of the hatchback and van configuration typically include an access opening at the rear of the vehicle body and a lift gate selectively opening and closing the access opening. The lift gate is typically manually operated and specifically requires manual effort to move the gate between open and closed positions. Various attempts have been made to provide power actuation for the lift gate but none of the prior art power actuation systems have realized any significant degree of commercial success since they have either been unduly complicated, relatively expensive, or maintenance prone.

It is generally known to provide a power drive system for driving a movable panel such as a sliding door in movement between an open position and a closed position, where the driving arrangement accommodates shifting between manual operation and positively driven powered operation of the panel at any position along its path of movement while providing a control responsive to an overload to stop panel movement in the event an object is trapped by the closing panel. These types of power drive systems are especially well adapted for use in operating the sliding door of a van-type vehicle. Typically, a power drive system is capable of driving an output member coupled to the door to drive the door in either direction over a relatively long working stroke. The coupling between the output member and the door can take the form of a positive mechanical interconnection between the motor and the door operable in either direction of movement as required. Additional problems may be presented where the power drive system is to power the sliding door of a van-type vehicle over and above the forgoing considerations applicable to sliding doors in general.

The power drive system of a sliding door in a van-type vehicle application is conventionally mounted on either longitudinally extending side of the van and the system may be operated by control switches accessible from the driver's seat. However, there are many occasions where the driver may desire to open or close the door manually, such as when the driver is outside the van loading or unloading articles through the sliding door and the controls are out of reach. A positively mechanically linked connection between the door and power source will interfere with manual operation of the door and may disturb a relationship between the door and drive relied on by the control system to sense the position of the door along its path of travel.

Translation of a vehicle panel typically requires an efficient set of machine elements and clutches to allow the panel to overhaul the system. Yet the driving system must drive efficiently and not offer a significant resistance when being overhauled. A soft coupling may be employed to assure system loads remain in the range of acceptable machine element loads. A ball nut is a highly efficient machine element when used with a ball screw. However, the ball screw is rigid and expensive when used in applications requiring significant travel, while generally being incapable of accommodating movement along a path that is not linear.

SUMMARY OF THE INVENTION

The present invention provides a drive unit for a movable panel such as a vehicle trunk lid which includes a rotatable drive element and a non-rotatable drive element which is threadably engaged with the rotatable drive element for controlled bi-directional displacement of the panel. One or both of the drive elements is elongated. An electric motor drivingly engages the rotatable drive element. A first mounting device pivotally interconnects the rotatable drive element to a relatively fixed point of a host vehicle wherein the rotatable drive element is axially restrained but is free to rotate about the axis of elongation. A second mounting device pivotally interconnects the non-rotatable drive element to the movable panel wherein the non-rotatable drive element is both axially and rotatably restrained. Finally, means are provided to energize the motor to affect bi-directional control of the drive unit.

According to another aspect of the invention, biasing means such as concentric compression/tension coil springs, are provided to offset the loading imposed by the movable panel. This arrangement has the advantage of allowing the motor and certain drive unit components to be downsized.

According to still another aspect of the invention, a clutch is provided which is operative to momentarily disconnect the electric motor from the second mounting device in response to sensing excessive loads in the system. system. This arrangement protects the drive system and associated vehicle from damage/failure due to abusive manual overriding of the movable panel.

According to yet another aspect of the invention, a resilient damper is inserted between the motor armature output shaft and the concentric worm shaft. This feature has the advantage of absorbing momentary torsional loads to protect the drive system.

According to still yet another aspect of the invention, a resilient damper is series inserted between the motor armature output shaft and the concentric worm shaft. This feature has the advantage of axially isolating the output and worm shafts by continuously urging them axially apart whereby back drive forces are isolated from the motor armature.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

Vehicles in general, and particularly passenger vehicles such as automobiles employ numerous movable panels for various applications to provide openings and access within and through defined portions of the vehicle body. To enhance operator convenience and safety, the automobile industry frequently employs varied control systems for such functions as hatch lift gates, trunk and hood deck lids, sliding and hinged doors, sun roofs, window regulators, and the like. Mechanical advantage is often provided by sector (gear) drives, cable drives chain drives, belt drives and jack screw drives. Such drives can be operated manually, with power assist, or by both. Current development focus within the automobile industry is largely on improving popular systems through weight and part count reduction, packaging efficiency, system noise, back drive effort, cost (parts and labor) and ease of assembly and service. The present invention addresses all of these issues.

For purposes of descriptive clarity, the present invention is herein described in the context of one specific application, the power assisted opening and closing of the trunk (boot) lid of a conventional passenger automobile. Upon reading the present specification, it will become clear that the present invention invention can be applied with success in numerous systems and applications. Accordingly the application is to be considered as descriptive in nature and not limiting. Furthermore, the several embodiments of the invention are depicted in a quasi-schematic form to simplify and shorten the specification without departing from a complete and cogent presentation.

Figure 1:
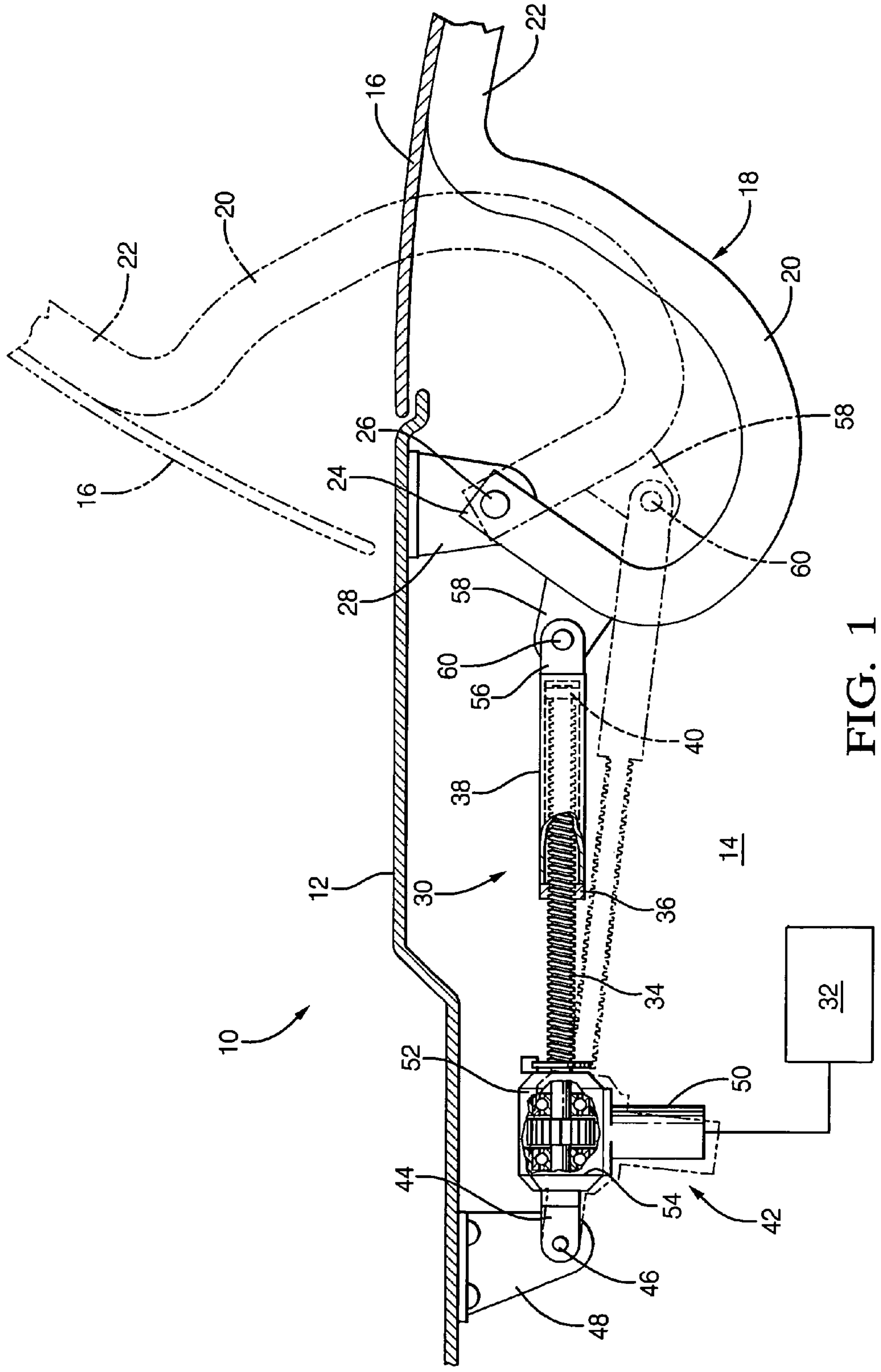
FIG. 1, is a broken, partial view of a vehicle body and a trunk lid hinge interconnected by a power linear actuator.

Referring to FIG. 1, a motor vehicle 10 having a body 12 provides a rear trunk space 14. A deck or trunk lid 16 is supported by a pair of pivoted arm assemblies 18 (only one illustrated) for movement between an open position (in phantom) permitting access to the trunk space 14 to a closed position (in hard line) closing access to the trunk space 14.

The pivoted arm assembly 18 which is not illustrated includes an arm having one end attached to the trunk lid 12 and one end hinged to the vehicle body 12 by a pivot pin for swinging movement about an axis extending transversely to the vehicle body 12. The second (illustrated) pivoted arm assembly 18 has a similar arm 20 that also has one end 24 hinged to the vehicle body 12 by a mounting bracket 28 for swinging movement about the same transverse axis. The deck lid 16 is rigidly secured to the two arms 20 at opposed ends 22.

Arms 20 each have an opposite end 24 pivotally affixed to the body 12 via a pin 26 and a mounting bracket 28 within rear trunk space 14. The illustrated pivoted arm assembly 18 is frequently referred to as a goose neck hinge.

A power deckled drive system 30 is mounted within the rear trunk space 14 and operates to swing the arm 20 and trunk lid 16 about the axis of pin 26 between the closed and open positions in response to operator initiated signals received from a controller 32. The drive system 30 includes an elongated, externally threaded rotatable drive element or jackscrew 34 which threadably engages an internally threaded concentric plastic nut 36 fixedly carried with a second relatively non-rotatable drive element or jackscrew guide tube 38. The jackscrew 34 has a spiral gearform with a pitch angle which is selected to be back drivable without the need for a clutch. The free end (right hand most as hand most as illustrated) of the jackscrew 34 carries a screw guide 40 in sliding engagement with the inner diameter surface of the guide tube 38. The screw end guide 40 is formed of nylon or other suitable material and functions to prevent buckling as well as to reduce system noise and ensure smooth sliding operation.

An electric motor assembly 42 is carried by a motor bracket 44 which, in turn, is interconnected to the body 12 by a connecting pin 46 and a mounting bracket 48. The motor assembly 42 includes an electric motor 50 in circuit with the controller 32 and a geared transmission or output drive 52. The left hand portion of the jackscrew 34 extends through the motor output drive 52 to engage a rightwardly facing thrust bearing 54 formed by the motor bracket 44. The motor output drive 52 engages the jackscrew 34 for controlled bi-directional rotation about its axis of elongation in response to control signals from the controller 32.

The right hand most end of the guide tube 38 terminates in an end cap 56 which is interconnected to a bracket 58 affixed to an intermediate portion of the arm 20 by a connecting pin 60. The bracket 58 is spaced from the end 24 of arm 20 to provide an appropriate mechanical advantage.

Optionally, an encoder wheel can be carried for rotation with the jackscrew 34 which is in register with a relatively stationary optical sensor configured to provide jackscrew positional feedback to the controller 32.

As depicted in FIG. 1, motor bracket 44, connecting pin 46 and mounting bracket 48 constitute a first mounting device which restricts axial displacement of the rotatable device or jackscrew 34 while permitting rotation of the jackscrew 34 about its axis subject to the driving effects of the motor assembly 42. Furthermore, the motor bracket 44, motor assembly 42 and jackscrew 34 have a limited freedom of rotation about the axis of the connecting pin 46. In addition, the pivoted arm assembly 18, mounting bracket 58 connecting pin 60 and end cap 56 constitute a second mounting device which prevents the non-rotatable device or jackscrew guide tube from axial or rotational displacement while connecting the guide tube 38 to the movable panel or trunk or trunk lid 16. Furthermore, the guide tube 38 and end cap 58 have limited freedom of rotation about the axis of the connecting pin 60.

In application, the motor 50 is typically actuated by a suitable control readily accessible to the operator of the vehicle 10, such, for example, as a hand-held fob (not illustrated) of the type employed to carry the vehicle keys. The control is such that when the deck lid 16 is closed, operation of the motor 50 rotates the jackscrew 34 in one direction, pushing the guide tube 38 axially away, increasing the separation between connection pins 46 and 60 at opposed ends of the drive system 30 to open trunk lid 16, and when the trunk lid 16 is open, the control reverse rotates the jackscrew 34 to decrease the separation between the connection pins 46 and 60 to close the trunk lid 16. Empirical test data has shown that for a typically configured vehicle 10, a nominal range of translation of the actuation axis of the drive system 30 about pivot pin 46 approximates 10°. The pitch of the threads formed in the jackscrew 34 and the nut 36 are selected effect minimal back drive force to enable manual override operation of the drive system without risk to the operator or the system.

In operation, the electric motor assembly 42 drives the jackscrew 34. As a result of rotation of jackscrew 34, nut 36 and guide tube 38 translate axially to extend or reduce the overall length of the drive system 30. The arrangement of FIG. 1 provides a number of benefits including: back drivability, without the use of a clutch mechanism, low mass, compact direct drive, low noise due to absence of high speed spur gears for gear reductions, low back drive effort due to a one stage gearbox, low cost with structural simplicity, simple assembly, and flexibly of installation.

Figure 2B:
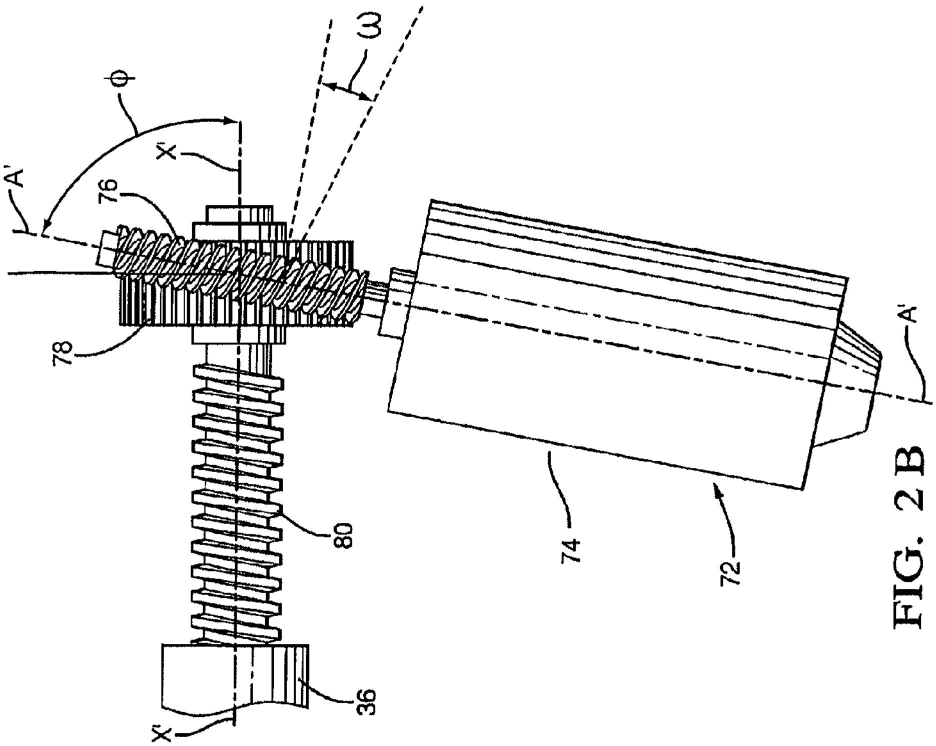
FIG. 2B, is an alternative design broken, detail view of the gearbox portion of the motor assembly of FIG. 2A.
Figure 2A:
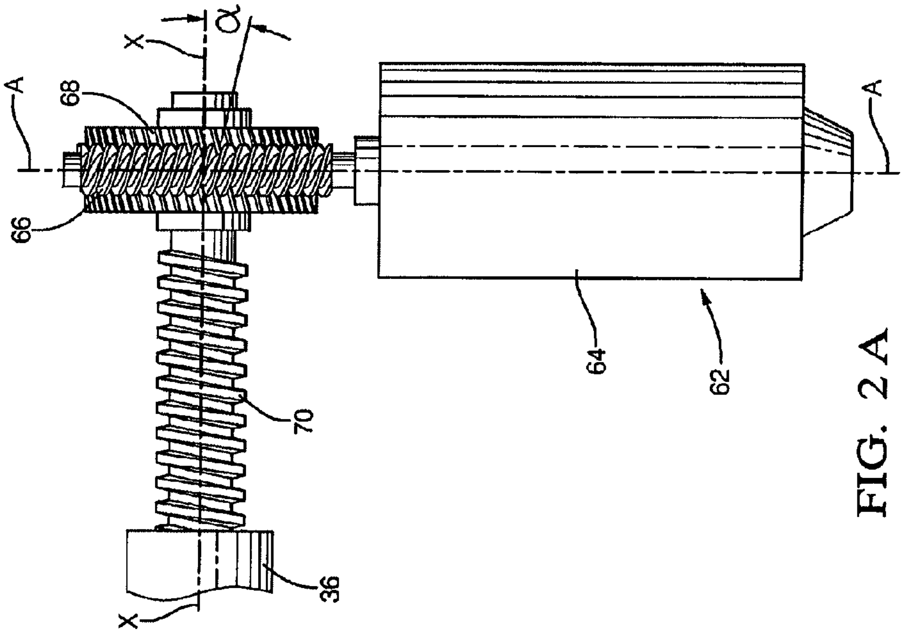
FIG. 2A, is a broken, detail view of the gearbox portion of the motor assembly of the linear actuator of FIG. 1, on an enlarged scale.

Referring to FIG. 2A, a simplified, schematic detail of an electric motor assembly 61 applicable for use in the power deckled drive system 30 of FIG. 1 is illustrated. For the sake of simplicity and understanding, the gearbox housing is deleted in this view. An electric motor 64 has an output drive in the form of a worm gear 66 which rotates about an axis designated A-A. The worm gear 66 is formed with a characteristic lead angle $\alpha$. The worm gear drivingly engages a helical gear 68 fixed to a jackscrew 70 for rotation therewith about an axis designated X-X. Axis A-A is disposed normally to axis X-X.

Referring to FIG. 2B, an alternative, simplified schematic detail of an electric motor assembly 72 applicable for use in the power deckled drive system 30 of FIG. 1 is illustrated. For the sake of simplicity and understanding, the gearbox housing is also deleted in this view. An electric motor 74 has an output drive in the form of a worm gear 76 which rotates about an axis designated A'-A'. The worm gear 76 is formed with a characteristic lead angle w. The worm gear drivingly engages a spur gear 78 fixed to a jackscrew 80 for rotation therewith about an axis designated X'-X'. Axis A'-A' is disposed angularly offset to axis X'-X' creating a worm gear offset angle $\Phi$ extending between the axis A'-A' and the axis X'-X'. In the illustrated construction, the worm gear offset angle $\Phi$ is complementary to the lead angle $\omega$.

The embodiment of FIG. 2B is essentially similar to the embodiment of FIG. 2A with the exception of the motor/gearbox. In the version of FIG. 2B, instead of having a cross-axis worm/helical angle of 90°, the angle is reduced by the lead angle of the worm. This allows the helical gear 68 to be replaced by a straight spur gear 78.

The gear set depicted in FIG. 2B is believed to be more efficient for power operation and manual back-driving of the drive unit 30. This is because the normal force generated by the worm 76 is in the same direction of rotation of the spur gear 78. With typical 90° cross-axis worm/helical gearboxes, only a component of the normal force goes to rotate the helical gear 68, the remainder is a loss in the form of thrust forces along the axis of the helical gear. This results in more power being delivered to the jackscrew 80 when powered and less force that need to be applied on the jackscrew 80 to back drive the drive unit 30.

Definitionally a "single stage gearbox" is deemed to include a gear power transmission containing a single gear set. The gears are cooperatively engaged for transmitting forces there between. A driven input is associated with one of the gears and a driving output is associated with the other of the gears.

Figure 3:
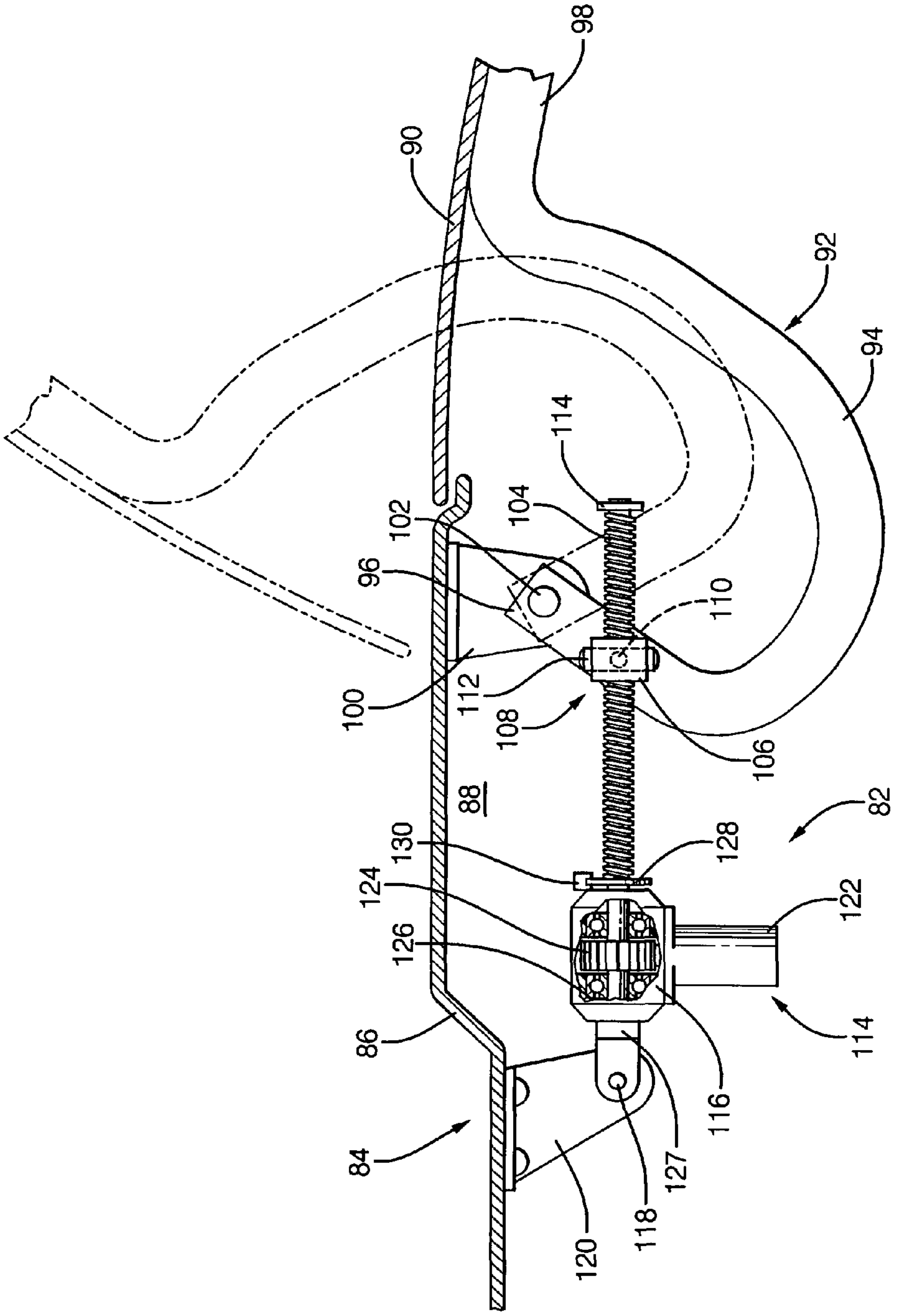
FIG. 3, is a broken, partial view of a vehicle body and a trunk lid hinge interconnected by a first alternative design power linear actuator.

Referring to FIG. 3, an alternative embodiment power deckled drive system 82 is illustrated. As in the case of the embodiment of FIG. 1, the drive system 82 is employed with a motor vehicle 84 having a body 86 which provides a rear trunk space 88. A deck or trunk lid 90 is supported by a pair of pivoted arm assemblies 92 (only one illustrated) for movement between an open position (in phantom) permitting access to the trunk space 88 to a closed position (in hard line) closing access to the trunk space 88.

Except as described herein, the alternative embodiment of the invention depicted in FIG. 3 (as well as other alternative embodiments described herein below) operates substantially similarly as that of FIG. 1. The illustrated pivoted arm assembly 92 has an arm 94 that has one end 96 hinged to the vehicle body 86 by a mounting bracket 100 and a pin 102 for swinging movement about a transverse axis. The deck lid 90 is rigidly secured to the two arms 94 at opposed ends 98.

The power deckled drive system 82 is mounted within the rear trunk space 88 and operates to swing the arm 94 and trunk lid 90 through a range of about 90° about the axis of pin 102 between the closed and open positions in response to operator initiated signals received from a controller (not illustrated). The drive system 82 includes an elongated, externally threaded rotatable drive element or jackscrew 104 which threadably engages an internally threaded concentric jackscrew nut 106 fixedly carried for relative non-rotation by arm 94 at an intermediate location there along. The jackscrew 104 has a spiral gearform with a pitch angle which is selected to be back drivable without the need for a clutch. The jackscrew nut 106 is operatively interconnected for movement with the mid-portion of the arm 94 by a gimbal-type device 108 with has a laterally extending opposed pair of pivot pins 110 (parallel to pin 102) and a vertically extending opposed pair of pivot pins 112. This arrangement provides freedom of relative rotation in two normal axes between the jackscrew nut 106 and the adjacent portion of the associated arm 94. The free end (right hand most as illustrated) of the jackscrew 104 carries an end stop 114 operative to limit relative rightward travel of the jackscrew nut 106 as it traverses axially along the along the jackscrew 104.

An electric motor assembly 114 is carried by a motor bracket 116 which, in turn, is interconnected to the body 86 by a connecting pin 118 and a mounting bracket 120. The motor assembly 114 includes an electric motor 122 in circuit with the controller and a geared transmission or output drive 124. The left hand portion of the jackscrew 104 extends through the motor output drive 124 to engage a rightwardly facing thrust bearing 126 formed by the motor bracket 120. The motor output drive 124 engages the jackscrew 104 for controlled bi-directional rotation about its axis of elongation in response to control signals from the controller.

An encoder wheel 128 can be carried for rotation with the jackscrew 104 which is in register with a relatively stationary optical sensor 130 configured to provide jackscrew positional feedback to the controller. Optionally, the encoder could be a magnetic encoded wheel with Hall effect sensors, or other suitable devices.

As depicted in FIG. 3, motor bracket 116, connecting pin 118 and mounting bracket 120 constitute a first mounting device which restricts axial displacement of the rotatable device or jackscrew 104 while permitting rotation of the jackscrew 104 about its axis subject to the driving effects of the motor assembly 114. Furthermore, the motor bracket 116, motor assembly 114 and jackscrew 104 have a limited freedom of rotation about the axis of the connecting pin 118. In addition, the pivoted arm assembly 92, and the gimbol device 108 constitute a second mounting device which prevents the non-rotatable device or jackscrew nut 106 from axial or rotational displacement by interconnection to the movable panel or trunk lid 90. Furthermore, the jackscrew nut has two axes of limited freedom of rotation about the axis of the connecting pins 110 and 112.

The embodiment of the present invention depicted in FIG. 3 operates substantially similarly to the above described embodiments. In the embodiment of FIG. 3, the guide tube 38 (FIG. 1) has been eliminated and the jackscrew nut 106 is attached to the moving member or vehicle panel 16/arm 94 arm 94 directly. This arrangement has the same advantages as set forth hereinabove. In addition, the embodiment depicted in FIG. 3 reduces the amount of packaging space required whereas the motor assembly 114 can be located near the hinge 92 in its closed position.

Figure 4:
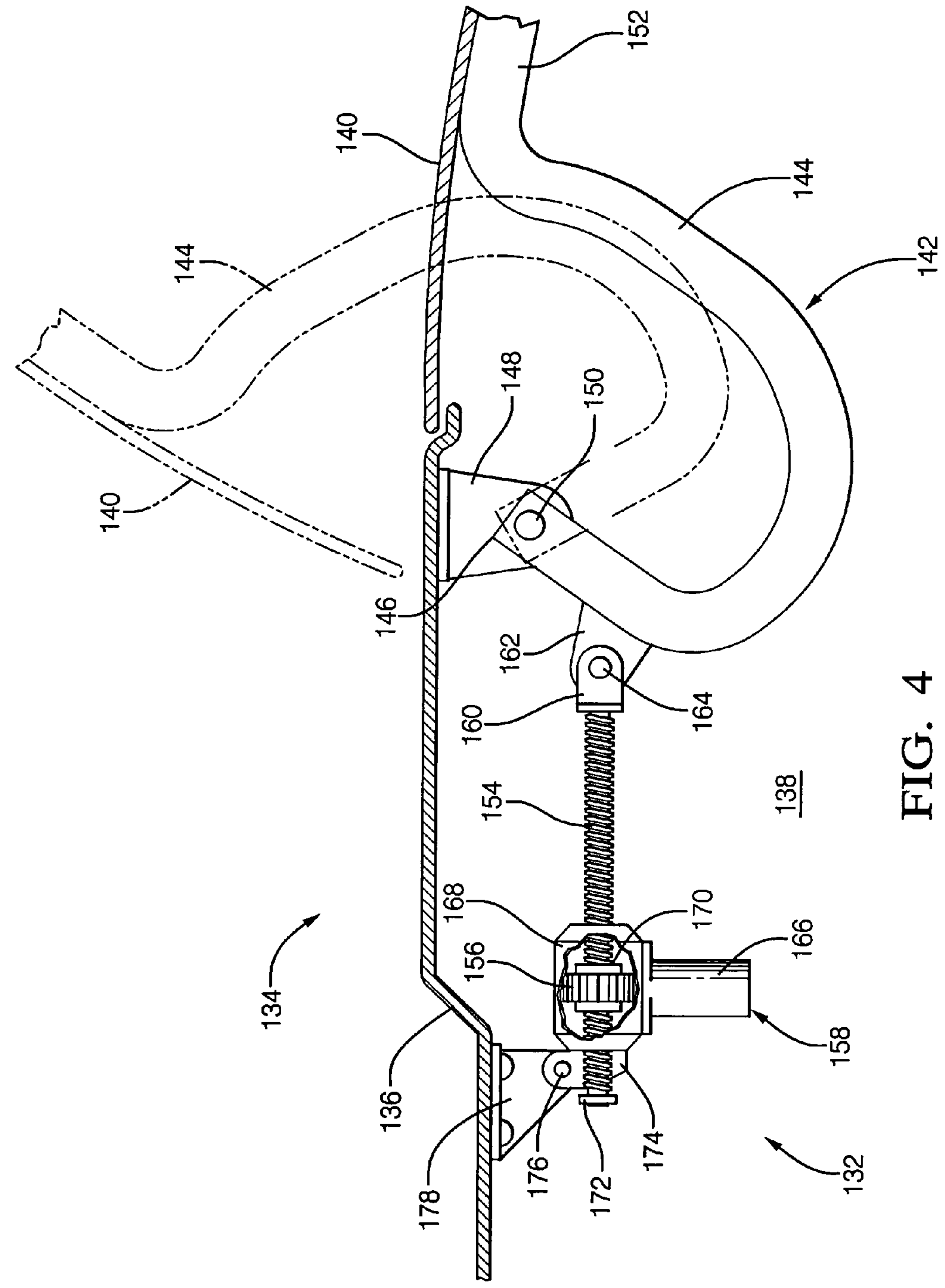
FIG. 4, is a broken, partial view of a vehicle body and a trunk lid hinge interconnected by a second alternative design power linear actuator.

Referring to FIG. 4, a second alternative embodiment power decided drive system 132 is illustrated. As in the case of the embodiment of FIGS. 1 and 3, the drive system 132 is employed with a motor vehicle 134 having a body 136 which provides a rear trunk space 138. A deck or trunk lid 140 is supported by a pair of pivoted arm assemblies 142 (only one illustrated) for movement between an open position (in phantom) permitting access to the trunk space 138 to a closed position (in hard line) closing access to the trunk space 138.

Except as described herein, the second alternative embodiment of the invention depicted in FIG. 4 operates substantially similarly as that of FIGS. 1 and 3. The illustrated pivoted arm assembly 142 has an arm 144 that has one end 146 hinged to the vehicle body 136 by a mounting bracket 148 and a pin 150 for swinging movement about a transverse axis. The deck lid 140 is rigidly secured to the two arms 144 at opposed ends 152.

The power decided drive system 132 is mounted within the rear trunk space 138 and operates to swing the arm 144 and trunk lid 140 through a range of about 90° about the axis of pin 150 between the closed and open positions in response to operator initiated signals received from a controller (not illustrated). The drive system 132 includes an elongated, externally threaded rotationally fixed drive element or jackscrew 154 which threadably engages an internally threaded concentric jackscrew nut integrated within a worm gear 156 carried within an electric motor assembly 158. In this alternative embodiment of the invention, the jack screw 154 is carried for relative non-rotation by arm 144 at an intermediate location there along. Specifically, the right hand end of the jack screw 154 is bifurcated to form a fork 160 which is affixed to an intermediate portion of arm 144 by a mounting bracket 162 and connecting pin 164 for translation therewith.

The jackscrew 154 has a spiral gearform with a pitch angle which is selected to be back drivable without the need for a clutch. The motor assembly 158 includes an electric motor 166 and a geared output drive 168 including the worm gear 156. The outer circumferential surface of the worm gear 156 has a spur or helical gear formed thereon for driving engagement with a worm formed on the motor's armature (refer FIGS. 2A and 2B). The central portion of the worm gear 156 has a threaded through passage 170 extending axially there through which threadably engages the thread form of the jackscrew 154. Restated, the central portion of the worm gear 156 constitutes a drive nut which, when drivingly rotated by the electric motor 166 displaces the jack screw 154 rightwardly or leftwardly as a function of the rotational sense of the electric motor 166. The free end (left hand most as illustrated) of the jackscrew 154 carries an end stop 172 operative to limit relative rightward travel of the jackscrew 154 as it traverses axially along through the jackscrew nut portion of the worm gear 156.

The electric motor assembly 158 is carried by a pivoting bracket 174 which, in turn, is interconnected to the body 136 by a connecting pin 176 and a mounting bracket 178. The motor assembly 158 includes the electric motor 166 in circuit with the controller (not illustrated) and the geared transmission or output drive 168. The motor output drive 168 engages the jackscrew 154 for controlled bi-directional rotation about its axis of elongation in response to control signals from the controller.

As depicted in FIG. 4, motor bracket 174, connecting pin 176 and mounting bracket 178 constitute a first mounting device which restricts axial displacement of the rotatable device or worm gear/nut 156 while permitting rotation of the worm gear/nut 156 about its axis subject to the driving effects of the motor assembly 158. Furthermore, the motor bracket 174, motor assembly 158 and worm gear/nut 156 have a limited freedom of rotation about the axis of the connecting pin 176. In addition, the pivoted arm assembly 142, the bracket 162 and the pin 164 constitute a second mounting device which prevents the non-rotatable device or jackscrew 154 from axial or rotational displacement by displacement by interconnection to the movable panel or trunk lid 140.

The embodiment of the present invention depicted in FIG. 4 operates substantially similarly to the above described embodiments. In the embodiment of FIG. 4, the jackscrew 154 can no longer rotate inasmuch as it is pivotally attached to the hinge arm 144. The jackscrew nut is now integrated into the worm gear 156 of the gearbox 168. When the motor 166 armature rotates, the worm turns the helical gear/nut 156 together to cause the jackscrew 154 to be "pulled" and "pushed" through the jackscrew nut 156, causing the hinge 142 to rotate. The arrangement of the embodiment of the invention of FIG. 4 has the same advantages of the above described embodiments. Furthermore, the present embodiment reduces the overall length of the drive system 132. The jackscrew nut 156 characteristic axial length, which is deemed as "dead space" is now packaged within the "dead space" of the motor gearbox 168.

Figure 5:
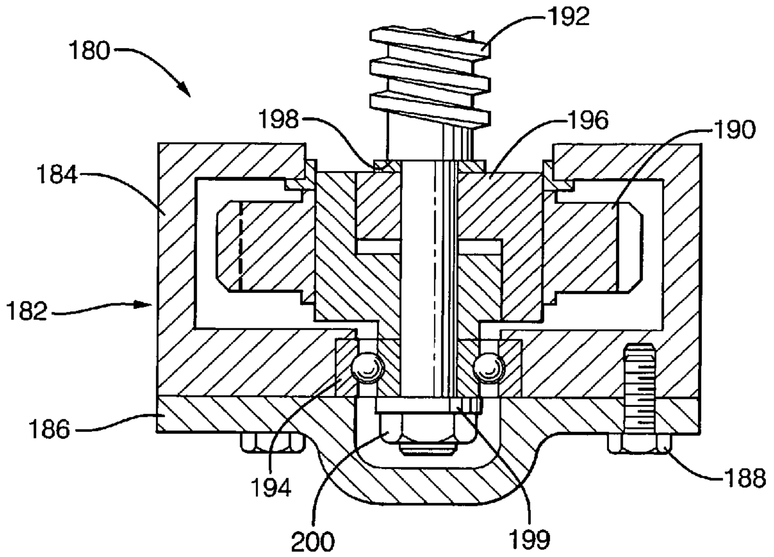
FIG. 5, is a broken, cross-sectional view of the gearbox portion of a third alternative design power linear actuator on an enlarged scale.

Referring to FIG. 5, a third alternative embodiment power deckled drive system 180 is illustrated. The drive system 180 is similar in most respects to the drive system 30 of FIG. 1 with the sole exceptions described herein below. The drive system 180 has a geared output drive 182 defined by a gear box housing 184 and an end fitting 186 interconnected by threaded fasteners/screws 188. An output gear 190 carried for rotation within the housing 184 is controllably driven by an associated electric motor armature worm (not illustrated). The end of a jackscrew 192 is supported for relative rotation within the housing 184 by a bearing assembly 194. A slip clutch mechanism 196 is axially captured between a step 198 in the jackscrew 192 and a retention nut 200 and a retention washer 199.

The slip clutch 196 releasably interconnects the end of the jackscrew 192 with the output gear 190 whereby during normal operation, the output gear 190 and the jackscrew 192 rotate in unison during powered opening and closing of the associated trunk lid. When high level torsion forces are applied to the jackscrew 192 through back driving the drive system 180 in response to abusive manual operation of the associated trunk lid and hinge, the slip clutch 196 momentarily releases its inter-engagement between the jackscrew 192 and output gear 190 to avoid mechanical damage to the system. When the transient over forces subside, the slip clutch re-engages the jackscrew 192 and output gear 190. When the slip clutch breaks free, there is still friction so the panel will not free fall. Alternatively, a free wheeling clutch can also be employed.

Figure 6:
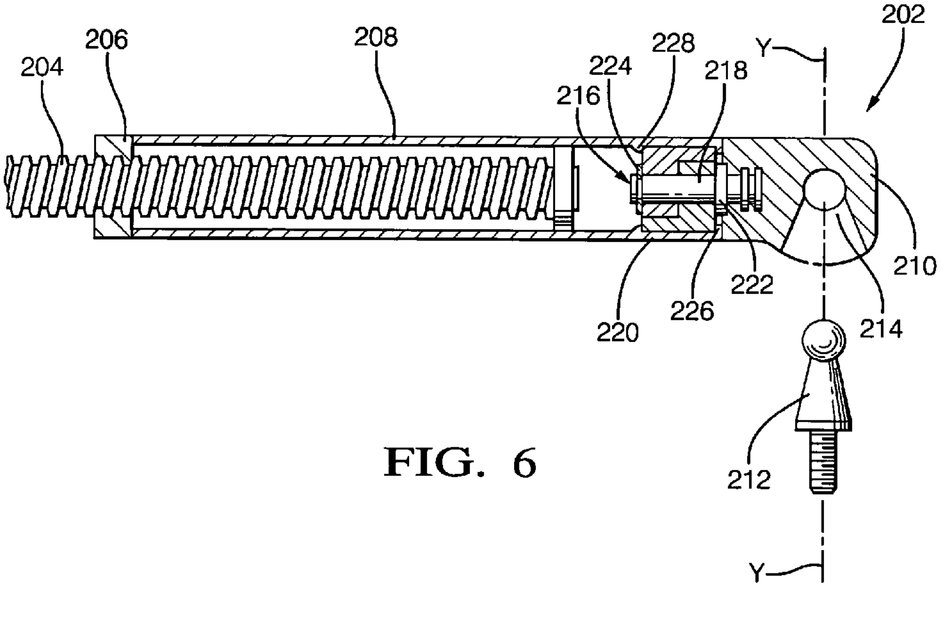
FIG. 6, is a broken, cross-sectional view of an end mounting portion of a fourth alternative design power linear actuator.

Referring to FIG. 6, a fourth alternative embodiment power deckled drive system 202 is illustrated. The drive system 202 is similar in most respects to the drive system 30 of FIG. 1 with the sole exceptions described herein below. The drive system 202 has a driven jackscrew 204 which threadably engages a drive nut 206 carried with a guide tube 108. The end of the guide tube 208 opposite the drive nut 206 is interconnected to an end fitting 210 adapted for mounting to an associated vehicle body or movable panel via a hinge ball stud 212. The hinge ball stud 212 has an axis of symmetry designated Y-Y along which a shaped recess 214 of the end fitting 210 engages the stud 212. The stud 212 is securely mounted to the host vehicle and rigidly secures the guide tube 208 along its axis of elongation, while permitting limited rotational freedom about its axis Y-Y.

A slip clutch assembly 216 interconnects the free, left hand most end of the guide tube 208 and the end fitting 210. The slip clutch assembly 216 includes an inner base member 218 which is affixed to the end fitting 210 and extends rightwardly there from. An outer slip clutch housing member 220 is carried concentrically externally of the base member 218 and is axially restrained in position by a rightwardly facing step 222 formed in the base member 218 and an opposed snap ring 224. The outer circumferential surface of the outer clutch housing 220 is fitted within the hollow end of the guide tube 208 and axially restrained in position by left and right upsets 226 and 228, respectively, formed in the guide tube.

The slip clutch 216 releasably interconnects the end of the guide tube 208 with the end fitting 210 whereby during normal operation, the guide tube 208 and the end fitting are locked together during powered opening and closing of the associated trunk lid. When high level torsion forces are applied to the jackscrew 204 through back driving the drive system 202 in response to abusive manual operation of the associated trunk lid and hinge, the slip clutch 216 momentarily releases its interengagement between the guide tube 208 and the end fitting to avoid mechanical damage to the system. When the transient over forces subside, the slip clutch 216 re-engages the guide tube 208 and end fitting 210.

Both of the slip clutches 196 and 216 of FIGS. 5 and 6, respectively, will handle any abusive loads on the system and will prevent overloading and damage to the drive components. In the case of the embodiment of FIG. 5, the jackscrew 192 will pass through the inner portion of the slip clutch 196 and be engaged to the slip clutch 196 by means of a D-shaped or splined shaft 192. The outer portion of the slip clutch 196 will be attached to the output gear 190 directly or through a compliant member (which absorbs smaller impact loads on the gear train). When an abusive load is applied, the slip clutch 196 will slip (rotate) so the jackscrew 192 and the output gear 190 rotate relative to one another. In the case of the embodiment of FIG. 6, the slip clutch housing 220 will be axially and rotationally fixed to the drive tube 208. The inner portion 218 of the slip clutch 216 will be attached to the end fitting 210. Accordingly, if there is an abusive load, the clutch 216 will slip the guide tube 208 relative to the end fitting 210 which will allow the nut 206 to rotate along the jackscrew 204.

Figure 7:
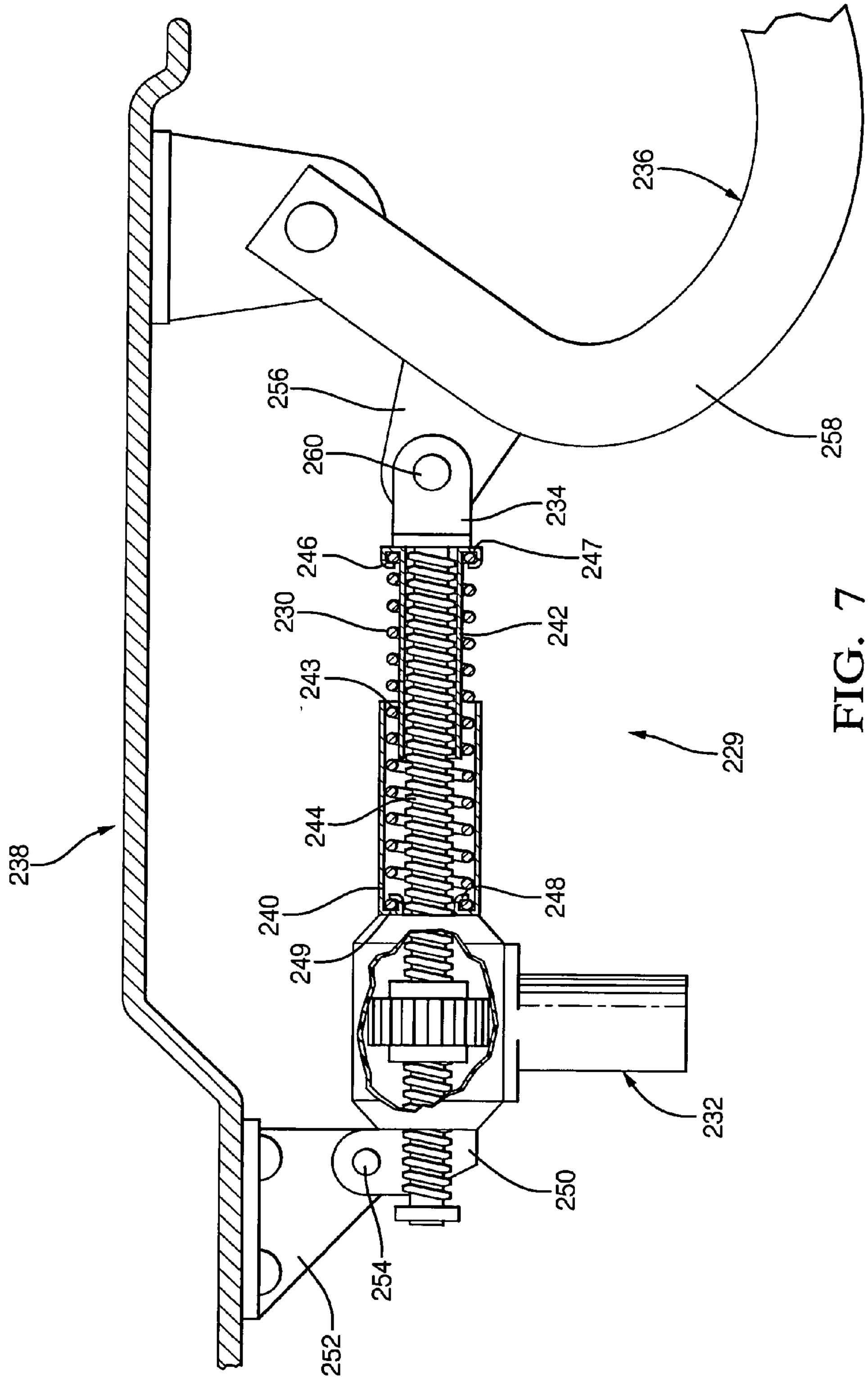
FIG. 7, is a schematic view of a fifth alternative design power linear actuator including a concentric helper spring.

Referring to FIG. 7, as an additional feature of the present invention, a power deckled drive system 229 includes a compression and/or tension spring 230 which extends between an electric motor assembly 232 and an end fitting 234. The spring 230 will act as a counterbalance for the movable panel (not illustrated) attached to a trunk lid hinge assembly 236. As in the other embodiments, the motor assembly 232 is interconnected to a vehicle body 238 by a pivoting bracket 250, a fixed bracket 252 and a pivot pin 254. The end fitting 234 is interconnected to a bracket 256 carried with a trunk lid hinge arm 258 by a pivot pin 260. An outer guide tube 240 is affixed to the motor assembly 232 by assembly 232 by welding, mechanical attachment or the like, and extends as a cantilever towards the end fitting 234 concentrically with the spring 230 and a jackscrew 244. Similarly, an inner guide tube 242 is affixed to the end fitting 234 by welding, mechanical attachment or the like, and extends as a cantilever towards the motor assembly 232 concentrically with the outer guide tube 240. The inner and outer guide tubes 242 and 240 are juxtaposed telescopically and are radially dimensioned to provide a radial gap 243 there between to guide the spring 230, preventing it from buckling or contacting the jackscrew 244 or external mechanisms. Should the spring 230 be employed as a tension spring 230, integral retention tabs 246 and 248 formed on base members 247 and 249 of the inner and outer guide tubes 242 and 240, respectively, serve to maintain the spring 230 in a fully extended orientation at all times, continuously urging the motor assembly 232 towards the end fitting 234. Should the spring be employed as a compression spring 230, retention tabs are not required, assuming that the spring 230 is continuously compressively loaded.

Figure 8:
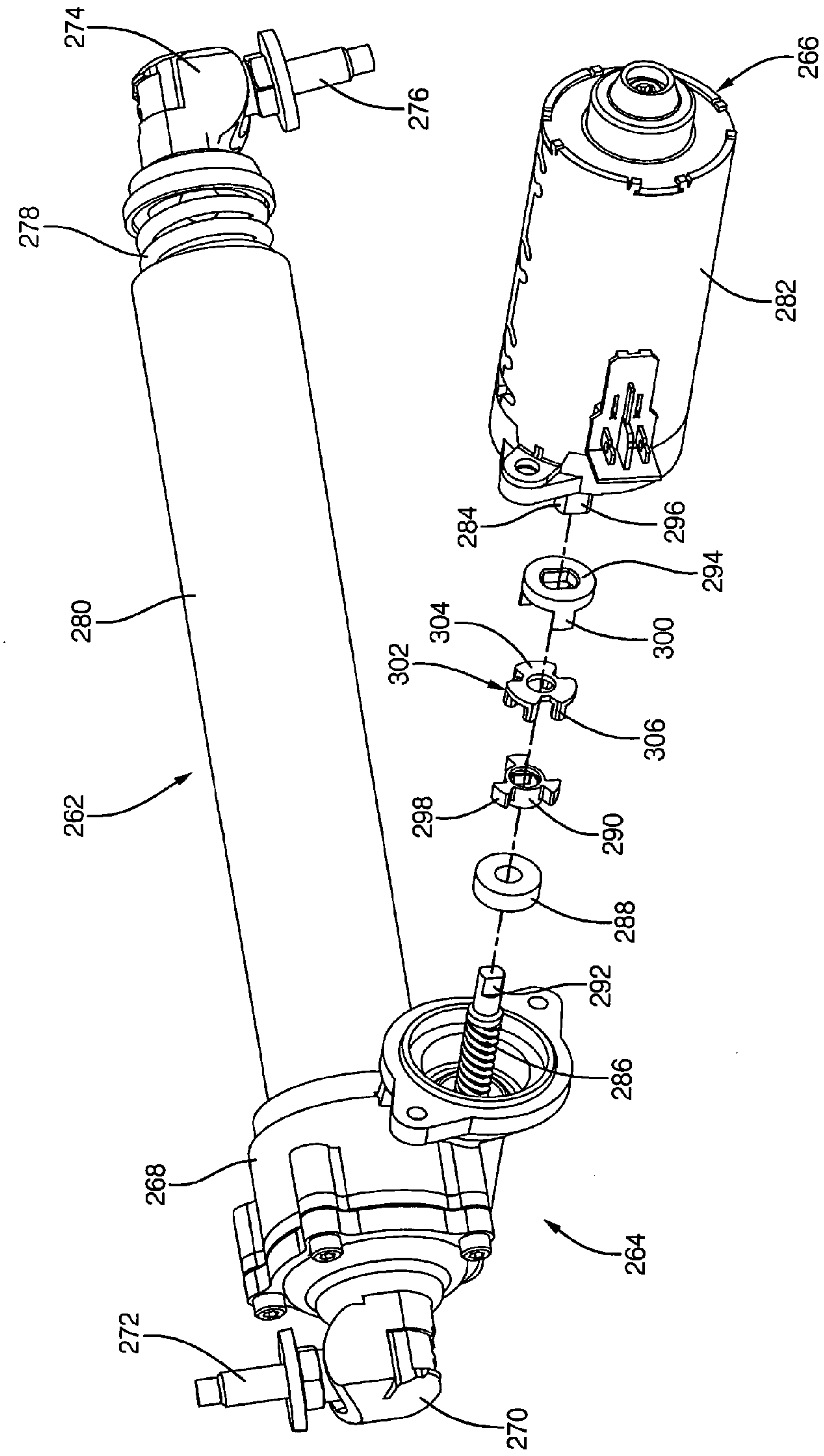
FIG. 8, is an exploded, perspective view of the motor compliant coupling portion of a sixth alternative design power linear actuator.

Referring to FIG. 8, as an additional feature of the present invention, a compliant coupling is inserted between the motor armature shaft and the drive worm. With this arrangement, back driven thrust loads are absorbed by the motor gearbox housing. The motor will only provide a torque to the worm shaft.

FIG. 8 depicts a power decided drive actuator 262 similar in most respects with the drive actuator 229 of FIG. 7. The drive actuator 262 includes an electric motor assembly 264 including an electric motor 266 and a gear box housing 268. A first end fitting 270 is rigidly affixed to the gearbox housing 268. End fitting 270 supports a hinge ball stud 272 which is adapted for fixation to a first location on a host vehicle. The end of the drive actuator 262 opposite the electric motor assembly 264 has a second end fitting 274 affixed thereto. End fitting 274 supports a hinge ball stud 276 which is adapted for fixation to a second location on the host vehicle which is to be controllably displacable from the first location. A jackscrew (not illustrated), compression spring 278 and spring guide tube 280 are concentrically disposed and extend between the end fittings 270 and 274.

The electric motor 266 includes a stator assembly 282 mechanically coupled to the gear box housing 268 and an armature disposed for rotation therein. The armature has an output shaft 284 which is axially in register with a worm shaft 286 extending through the gear box housing 268 for engaging a drive gear (not illustrated). Refer FIGS. 2A and 2B. The worm shaft 286 is supported at each end by a bearing 288 (only one is illustrated) for rotation within the gear box housing 268. A first coupler half 290 is keyed to a flat 292 on the end of the worm shaft 286 for rotation therewith. A second coupler half 294 is similarly keyed to a flat 296 on the opposed armature output shaft 284. The coupler halves 290 and 294 have cooperating integral fingers 298 and 300, respectively, which, upon assembly are interdigitated to self-engage one another upon the application of a driving torque by the motor 266 while allowing a small degree of limited relative rotational freedom. The coupler halves 290 and 294 are formed of relatively hard material such as pressed metal. A spider 302 formed of resilient material such as high durometer hard rubber has an annular base portion 304 and a number of integral finger portions 306 extending there from.

In assembly, the spider 302 serves to space the opposed coupler halves wherein the base portion 304 provides axial isolation and the finger portions 304 are interposed between adjacent pairs of interdigitated fingers 298 and 300 to provide circumferential isolation.

In application, motor 282 induced torque is transferred from fingers 300 of coupler half 294 to the fingers 298 of the coupler half 290 for driving the worm shaft 286. Transients or torsional shock loads are absorbed by momentary compression and relaxation of the finger portions 306 of the spider 302. The axial component of forces transferred to the worm shaft 286 from the motor 266 are transferred into the housing 268 through a bushing surface (not illustrated). The base portion 304 of the spider 302 provides a limited axial degree of freedom of the worm shaft 286 in the direction toward the motor 266. Thus, axial shock loads resulting from back driving the drive system 262 are transferred from the worm shaft 286 to the gear box housing 268 and are contained therein. No additional thrust protection is thus required for the motor 266. This arrangement separates some of the vibration of the motor to the worm, so less vibration is transmitted through the gearbox for a quieter drive unit. Further it provides modularity to the design, keeping cost lower, and enabling the swap-out of different motors with different motor performance characteristics to achieve different drive unit performances. This has a distinct advantage in allowing electric motors of standard design to be employed in the present invention, further reducing system cost.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. For example, the illustrated embodiments could be attached at their respective ends employing hinge ball studs such as those employed in hatch gas support struts. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A drive actuator for use on a motor vehicle having a body and a moveable panel, the drive actuator comprising:
- a first drive element coupleable to one of the body and the moveable panel;
- a drivescrew coupled to the first drive element, the drivescrew defining a first axis and having a spiral gearform with a pitch angle selected to be backdrivable;
- a second drive element coupleable to the other of the body and the moveable panel, the second drive element coupled to the drivescrew and moveable with respect to the first drive element along the first axis between an open position and a closed position;
- a worm gear drivingly coupled to the drivescrew and defining a second axis, wherein the worm gear offset angle between the first axis and the second axis is less than 90 degrees;
- a motor coupled to the first drive element and operatively coupled to the worm gear; and
- wherein the drive actuator is operable in a power assist mode, where the motor imparts a torque onto the worm gear causing the first drive element to move with respect to the second drive element along the first axis between the open position and the closed position, and a manual operation mode, where a user imparts force onto the movable panel causing the first drive element to move with respect to the second drive element along the first axis between the open position and the closed position while rotating an output shaft of the motor.

2. The drive actuator of claim 1, wherein the worm gear includes a spiral gearform having a first lead angle, and wherein the worm gear offset angle is the complement of the first lead angle.

3. The drive actuator of claim 1, further comprising a first gear coupled to the drivescrew and rotateable therewith, and wherein the worm gear drivingly engages the first gear.

4. The drive actuator of claim 1, further comprising a first gear coupled to the drivescrew and rotateable therewith, and wherein the first gear is a spur gear.

5. The drive actuator of claim 1, wherein the second drive element is threadably coupled to the drivescrew, and wherein rotation of the drivescrew relative to the second drive element biases the second drive element along the first axis between the open position and the closed position.

6. The drive actuator of claim 1, further comprising a biasing member extending between the first drive element and the second drive element.

7. The drive actuator of claim 6, wherein the biasing member biases the second drive element toward the open position.

8. The drive actuator of claim 1, further comprising a slip clutch positioned between the motor and the drivescrew to transfer torque therebetween, and wherein the slip clutch at least partially disengages based at least in part on the torsion load applied to the drivescrew.

9. The drive actuator of claim 8, wherein the moveable panel includes a mass, and wherein during disengagement the slip clutch transmits sufficient torque between the drivescrew and the motor to support at least a portion of the mass of the moveable panel.

10. The drive actuator of claim 8, wherein the slip clutch at least partially disengages during the manual operation mode.

11. A drive actuator for use on a motor vehicle having a body and a moveable panel, the drive actuator operable in a power assist mode and a manual operation mode, the drive actuator comprising:

a first drive element coupleable to one of the body and the moveable panel;

a drivescrew coupled to the first drive element, the drivescrew defining a first axis and having a spiral gearform with a pitch angle selected to be backdrivable;

a second drive element coupleable to the other of the body and the moveable panel, the second drive element coupled to the drivescrew and moveable with respect to the first drive element along the first axis between an open position and a closed position;

a motor coupled to the first drive element and operatively coupled to the drivescrew gear;

a slip clutch releasably interconnecting the motor and the drivescrew, wherein the slip clutch transmits a first level of torque between the motor and drive screw during a power assist mode, and wherein the slip clutch transmits a second level of torque less than the first level of torque during a manual operation mode.

12. The drive actuator of claim 11, wherein the moveable panel is pivotable with respect to the body about a pivot axis between an open position and a closed position, wherein the movable panel has a first mass imparting a mass torque about the pivot axis, and wherein the second level of torque is greater than the mass torque.

13. The drive actuator of claim 12, wherein the mass torque varies at least partially dependent upon the orientation of the vehicle.

* * * * *